Sept. 2, 1924.                  G. C. GOODE                 1,506,898
                                VEHICLE SPRING
                              Filed March 25, 1922
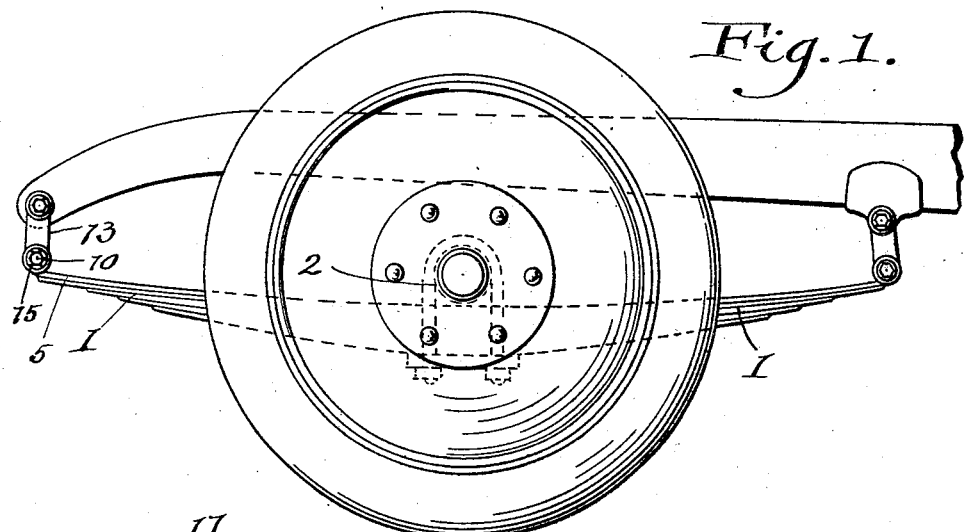
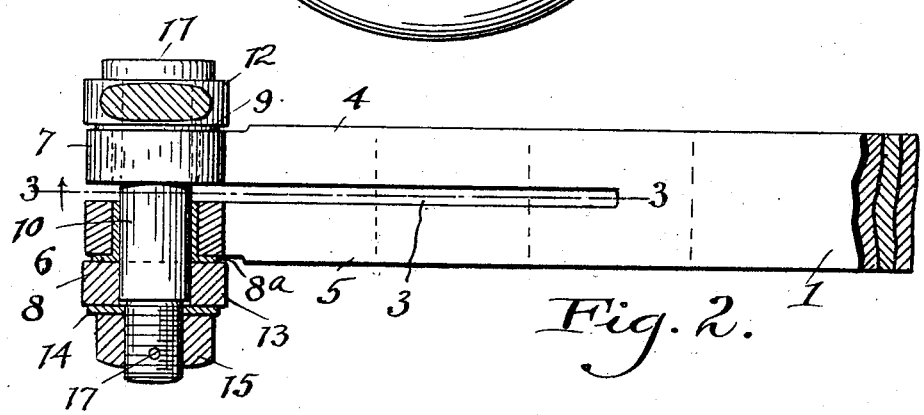
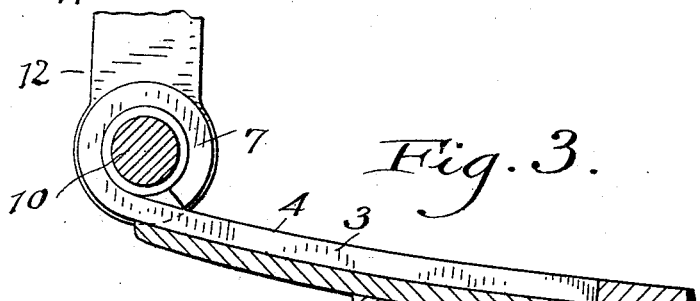

Patented Sept. 2, 1924.

1,506,898

UNITED STATES PATENT OFFICE.

GILBERT C. GOODE, OF CLEVELAND, OHIO, ASSIGNOR TO THE WHITE MOTOR COMPANY, OF CLEVELAND, OHIO, A CORPORATION OF OHIO.

VEHICLE SPRING.

Application filed March 25, 1922. Serial No. 546,581.

*To all whom it may concern:*

Be it known that I, GILBERT C. GOODE, a citizen of the United States, residing at Cleveland, in the county of Cuyahoga and State of Ohio, have invented a certain new and useful Improvement in Vehicle Springs, of which the following is a full, clear, and exact description.

The present invention relates to the construction of a spring for use with vehicles, and the object of the invention is to provide a spring which will, in addition to its function of supporting the chassis or body of the vehicle, be so fashioned at the ends of the spring that portions of the spring itself will exert a tendency to keep the shackles to which the ends of the spring are connected, from becoming loosened, rattling, or perchance, loosening the nut on the bolt which holds the shackles and spring together.

Reference should be had to the accompanying drawings forming a part of the specification, in which Fig. 1 is a side elevation of a portion of a chassis wheel and axle with a spring in position with respect thereto; Fig. 2 is a top plan view of a portion of the spring with parts of the shackle in section; Fig. 3 is a section on the line 3—3 of Fig. 2.

The spring, which is generally indicated at 1, may be made up in any desired fashion, and as illustrative of one way in which the spring may be made up, it is shown as comprising a plurality of superimposed leaves of differing length which are secured together by means of the usual yoke structure 2.

At the end of the spring the top leaf is bifurcated by providing a slot 3 which extends from the end of the top leaf longitudinally for a certain distance thereof, thus providing two arms 4 and 5. Each of these arms 4 and 5 at the outer end is formed with an eye, such as indicated at 6 and 7, the eye being formed in any desired manner and preferably in the manner usually employed in the making of springs at the present time.

Extending through each of the eyes are bushings which are indicated at 8 and 9, each of these bushings having a sleeve portion which fits within the eye, and a face portion, such as indicated at 8ª, which overlies the outside of the eye.

Extending through the bushings 8 and 9 is a bolt 10 having a head 11 which bears against the lower portion of a shackle link 12. Upon the outside of the eye 6 there is also a shackle link 13, and beyond this is a washer 14, and the nut 15 which is threaded on the end of the bolt 10. The nut 15 is tightened, and as it is tightened it will place the arms 4 and 5 of the bifurcated end of the top spring leaf under lateral tension, and this tension is permitted because the top leaf is slotted. When this has been accomplished the nut may be secured in position by any desired manner, as by placing a pin in a drilled hole extending through the nut and bolt, as indicated at 17. This pin will prevent the nut from turning with respect to the bolt.

It will be apparent that inasmuch as the arms 4 and 5 are under tension, they will continuously exert an outward pressure against the shackles 12 and 13, so that any wearing of the parts will be compensated for by this slight outward movement of the parts 4 and 5 of the spring, and therefore all parts of this spring and shackle mounting will be continuously maintained in tight relationship, so that there will be no rattling and no play between the various parts of the structure involved. The shackles 12 and 13 may be fastened to the chassis or body of the vehicle in any desired manner, as for instance, by the usual method or practice.

While the end of the spring and the mounting therefor is described with respect to one end only of the spring, it will be understood that both ends of the spring may be similarly formed and similarly mounted.

Having described my invention, I claim:—

1. A leaf spring for vehicle suspension having a long leaf and superposed progressively shorter leaves forming a flexible end portion and a rigid portion adapted to be attached to a part of the vehicle, said long leaf having a projecting end portion adapted to receive attaching means, said long leaf having a slot extending longitudinally from the end thereof and terminating short of the rigid portion of the spring, to provide two resilient but relatively rigid arms adapted to be placed under lateral tension by the attaching means.

2. A leaf spring having a flexible end portion and a rigid portion adapted to be secured to a part of the vehicle, said flexible end portion of the spring having a slot extending inwardly a short distance from the end to provide resilient but relatively rigid parallel arms, said arms at their outer ends being provided with aligned eyes adapted to receive a shackle bolt and said arms being adapted to be sprung slightly and placed under lateral tension when the bolt is tightened whereby an outward pressure is maintained upon the head and nut of the bolt.

In testimony whereof, I hereunto affix my signature.

GILBERT C. GOODE.